Aug. 4, 1936.        L. A. GIDEON        2,049,497
X-RAY FILM PACKET
Filed Nov. 30, 1934
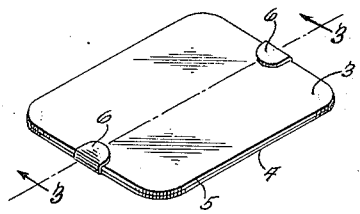
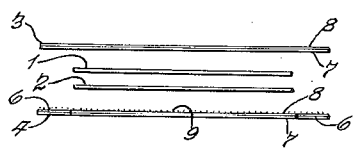
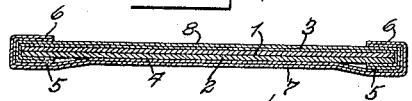
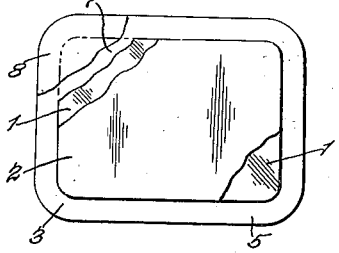
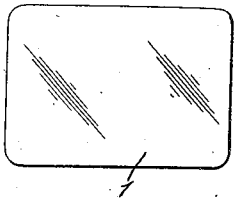
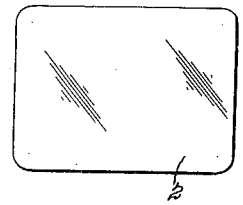
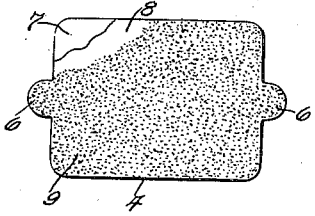
Inventor
Lehman A. Gideon
by Rippey & Kingsland
His Attorneys.

Patented Aug. 4, 1936

2,049,497

UNITED STATES PATENT OFFICE 2,049,497

X-RAY FILM PACKET

Lehman A. Gideon, Bismarck, Mo.

Application November 30, 1934, Serial No. 755,300

3 Claims. (Cl. 250—34)

This invention relates to a film packet for use in making X-ray photographs of teeth.

Film packets for such use have heretofore included a metallic back relatively thin of soft impressionable metal with the margins of the back turned over against the exposure face of the film. Since the metal used for this back is impervious to Roentgen rays the effective surface of the film is thereby reduced. One of the objects of this invention, therefore, is to produce a packet in which the full surface of the film will be effective.

Another object of the invention is to produce a film packet which will be economical to manufacture, which will have improved photographic properties, which will be so constructed as to avoid imperfections in manufacture giving a greater relative number of perfect packages, and which will be more nearly moisture proof.

Other and specific objects of the invention will be apparent from the following detail description.

In the drawing, Fig. 1 is a perspective view of the completed packet;

Fig. 2 is a view showing the several parts of the packet in separated relationship;

Fig. 3 is a cross section on line 3—3, Fig. 1;

Fig. 4 is a plan view partly in section showing a step in the process of manufacture; and Figs. 5, 6 and 7 illustrate on the same scale parts of the structure, Fig. 5 showing the film, Fig. 6 the back and Fig. 7 the rear member, partly in section.

The packet includes a photographic film 1, which is enclosed in an envelope comprising a back 2 of relatively soft impressionable metal and substantially co-extensive in size with the film, a front closure member 3 and a rear member 4; the members 3 and 4 each being a two-ply sheet consisting of a layer of aluminum foil, transparent to Roentgen rays, and a layer of backing material such as paper. The film 1 is placed next to the front closure member 3 and the metallic back 2 is placed next to the film 1, with the margin 5 (see Fig. 4) turned over upon the exposed face of the metallic back 2. The rear member 4 (see Fig. 7) also consists of a two-ply sheet of aluminum foil and paper and is of substantially the same size as the film and the back except for the tabs 6. The rear member 4 is secured by tacky material to the outer face of the back 2 and the turned margins of the front closure sheet. The tabs 6 are turned over and engage the outer face of the front closure member 3.

The sheets 3 and 4 are cut from a material comprising preferably a two-ply sheet of aluminum foil 7 and paper backing 8. This material is produced commercially in large quantities and a particular grade or product is known on the market as "unifoil". The words "aluminum foil" as used herein are intended to include foils made from an alloy of aluminum which includes other metal or metals added to increase the ductility and strength.

The sheet 4 is gummed, that is to say it has tacky material 9 on the paper face. The ears 6 on the sheet 4 not only serve to prevent the sheets from separating but also serve as a convenient means for opening the packet.

The metallic back 2 is preferably of lead and impervious to Roentgen rays. It is impressionable in order that it may be readily bent for convenient insertion into a subject's mouth and then subsequently straightened.

For convenience, in assembling the package the paper face 8 of the front closure member 3 is exposed and the metallic face 7 of the rear closure member 4 is exposed, thus indicating the front and back of the packet.

The aluminum foil is substantially transparent to Roentgen rays and, in fact, acts as an intensifying screen to increase the photographic qualities of the package. Since the film is enveloped within a metal foil, it is more nearly impervious to moisture than other packages. A unitary sheet comprising the metallic foil and backing material of paper is used to secure the added strength and stability afforded by the paper.

Thus, it will be seen that a package has been produced which has improved characteristics as to its photographic properties and moisture proof characteristics. In turning the margins of the closure member 3 fewer imperfect packages result than where it is attempted to secure the film by turning the margins of a lead back. Further, the entire face of the film is subject to photographic impression and its effective area is not reduced along its margin as it is in the prior art devices where the lead back is folded over the edge of the film.

The foregoing is a description of a preferred embodiment specifically illustrated in the drawing, it being understood that the characteristic features of the invention are pointed out in the appended claims, that various changes may be made in the details of construction, within the scope of the claims, without departing from the spirit of the invention, and that parts of the invention may be used without the whole.

I claim:

1. An X-ray film packet comprising a back of soft impressionable metal, a photographic film next to said metal back, a two-ply front sheet covering the film, consisting of a layer of metallic foil transparent to Roentgen rays and a layer of backing material and having its margins turned over against said metal back, and a rear member tacked to the back and the turned margins of the front sheet.

2. An X-ray film packet comprising a back of soft impressionable metal, a photographic film next to said metal back, a two-ply front sheet covering the film, consisting of a layer of metallic foil transparent to Roentgen rays and a layer of backing material and having its margins turned over against said metal back, and a two-ply rear member tacked to the back and to the turned margins of the front sheet and consisting of a layer of metallic foil and a layer of backing material.

3. An X-ray film packet comprising a back of soft impressionable metal, a photographic film next to the back, a two-ply front sheet covering the film, consisting of a layer of aluminum foil and a layer of paper and having its margins turned over against said metal back, and a rear member tacked to the back and to the turned margins of the front sheet and consisting of a layer of metallic foil and a layer of paper.

LEHMAN A. GIDEON.